United States Patent [19]

Barie, Jr.

[11] 3,932,343

[45] Jan. 13, 1976

[54] MIXED EPOXY RESIN-MIXED ANHYDRIDE ADHESIVE COMPOSITIONS

[75] Inventor: Walter P. Barie, Jr., Shaler Township, Pa.

[73] Assignee: Gulf Research & Development Company, Pittsburgh, Pa.

[22] Filed: May 9, 1974

[21] Appl. No.: 468,553

[52] U.S. Cl. ....... 260/37 EP; 106/39 R; 117/124 E; 117/128.4; 117/161 ZB; 260/830 TW
[51] Int. Cl.² .................. C08G 51/04; C08G 45/04
[58] Field of Search.... 260/47 EC, 47 EA, 830 TW, 260/78.4 EP, 37 EP

[56] References Cited
UNITED STATES PATENTS

| | | | |
|---|---|---|---|
| 3,324,081 | 6/1967 | Barie et al. | 260/47 |
| 3,362,922 | 1/1968 | Manasia et al. | 260/47 X |
| 3,502,609 | 3/1970 | Barie et al. | 260/47 X |
| 3,624,032 | 11/1971 | Miyashiro | 260/47 |

*Primary Examiner*—Donald E. Czaja
*Assistant Examiner*—T. Pertilla

[57] ABSTRACT

A new epoxy resin adhesive composition having exceptionally high tensile lap shear strength is prepared from a mixture of a polyglycidyl ether of a novolac resin, a diglycidyl ether of bisphenol A, 3,4,3',4'-benzophenone tetracarboxylic dianhydride and maleic anhydride. The resin is cured with a metal complex of acetylacetone such as zinc acetylacetonate.

9 Claims, No Drawings

MIXED EPOXY RESIN-MIXED ANHYDRIDE ADHESIVE COMPOSITIONS

This invention relates to new and useful epoxy resin adhesive compositions which are cured at relatively mild conditions and which have exceptionally high tensile lap shear strength values.

Heretofore, epoxy resin adhesive compositions having excellent tensile lap shear strength have been made from a diglycidyl ether of bisphenol A epoxy resin and 3,4,3′4′-benzophenone tetracarboxylic dianhydride. The tensile lap shear strength of adhesives prepared from optimum formulations using these components and cured at optimum conditions generally varies between about 2,400 to 2,800 psi. Since the tensile lap shear strength as determined by ASTM D1002-64 is the accepted standard for determining the functional quality of an adhesive, it can be stated as a general guide that the greater the tensile lap shear strength, the better the adhesive. I have discovered that epoxy resin adhesive compositions of exceptionally high tensile lap shear strengths, up to and exceeding 4,000 psi., can be prepared from a mixture of epoxy resins and anhydrides, that is, a diglycidyl ether of a dihydric phenol, a polyglycidyl ether of a novolac resin, maleic anhydride and 3,4,3′,4′-benzophenone tetracarboxylic dianhydride.

The diglycidyl ethers of dihydric phenols that are useful herein are generally made by the reaction of epichlorohydrin with a dihydric phenol, bisphenol A being the most frequently utilized dihydric phenol. The preferred diglycidyl ethers of dihydric phenols possess an average molecular weight of about 350 to about 600. As a result of the conventional method of preparation, that is by the reaction of epichlorohydrin and the dihydric phenol, the product is a mixture of molecules of different molecular weights, the preponderance of which possess a molecular weight between about 350 and about 600 in the formulations preferred herein. The polyglycidyl ethers of novolac resins are conventionally made by the reaction of epichlorohydrin with the phenolic hydroxyls in a novolac resin resulting in a mixture of variously sized molecules and a variation in the number of epoxy groups per molecule. The preferred polyglycidyl ethers of novolac resins which are used in producing the exceptionally high tensile lap shear strength adhesives herein have an average number of epoxy groups per molecule of between about two and about four.

This mixture of the diglycidyl ether of a dihydric phenol and the polyglycidyl ether of a novolac resin contains a weight ratio of the dihydric phenol diepoxide to the novolac polyepoxide as high as 3:1 but preferably no higher than about 1:1 and a ratio as low as 1:4 but preferably no lower than about 1:3. The most preferred weight ratio of the dihydric phenol diepoxide to the novolac polyepoxide is about 1:2.

The anhydride cross-linking agent that produces the excellent tensile lap shear strength in conjunction with the mixture of polyepoxides is maleic anhydride and 3,4,3′,4′-benzophenone tetracarboxylic dianhydride, at a weight ratio of the maleic anhydride to the diaryl dianhydride as high as about 3:1 but preferably no higher than about 2:1 and as low as about 1:4 but preferably no lower than about 1:3. The most preferred formulation utilizes the two anhydrides in about a 1:1 weight ratio.

I have discovered that both of the defined glycidyl-type epoxides are required within the proportions specified and both of the anhydrides within the proportions specified in order to obtain the exceptional tensile lap shear strength which, in part, characterizes this invention. In addition, the total amount of these glycidyl-type epoxides and the anhydrides must provide an A/E ratio (the ratio of the chemical anhydride equivalents to the chemical epoxide equivalents) of between about 0.4 and about 1.5 and preferably between about 0.6 and about 1.25.

The addition of fillers comprising a powered metal and, in particular, the addition of a combination of a metallic and non-metallic oxide filler results in useful adhesive formulations herein. Suitable metallic fillers include finely divided or powdered metals, exemplified but not limited to aluminum and iron.

Non-metallic fillers alone appear to decrease the tensile lap shear strength of the adhesives of this invention. On the other hand, the addition of a non-metallic oxide, such as silicon dioxide, together with the powdered metal results in a suitable tensile lap shear strength of the adhesive. The non-metallic oxide should be finely divided. In addition to the silicon dioxide mentioned above, suitable non-metallic oxide materials include alumina, calcium carbonate, magnesium silicate, alumina silicate, kaolin, hydrated alumina and thixotropic agents such as bentonite clays.

The fillers both metallic and non-metallic oxide can range in particle size between 200 mesh to about 0.015 micron. The amount of filler to be employed depends to some extent upon the thickening properties of the particular filler chosen. The metallic fillers, such as powdered aluminum, tend to have less thickening effect on the epoxy resin mixture than the non-metallic materials, such as the alumina silicates. The amount of metallic filler should be at least 20 parts per hundred parts of epoxy resin (phr.) and can suitably be as high as 200 phr. with the preferred amount of metallic filler being between 80 and 120 phr. Much lower amounts of the non-metallic oxide thickener type fillers are employed, amounts between 1 and 50 phr. being generally satisfactory and preferred amounts being between 1 and 20 phr.

As noted, the best adhesive formulations are those which use a combination of a powdered metallic filler, such as aluminum, and a finely divided non-metallic oxide filler, such as silicon dioxide. Particularly preferred combinations are those using between 80 and 120 phr. of powdered metals and between 1 and 10 phr. of the non-metallic oxide fillers.

Another significant aspect of this invention is my discovery that this exceptionally high tensile lap shear strength is obtained only when the resin formulation is cured to a copolymer of the four resin components with an accelerator comprising a metal complex of acetylacetone. Surprisingly, the use of this accelerator results in the exceptionally high tensile lap shear strength with the particular resin formulation specified herein but does not produce a significant improvement in prior art formulations such as a diglycidyl ether of bisphenol A and 3,4,3′,4′-benzophenone tetracarboxylic dianhydride formulation. Another substantial advantage resulting from the use of the metal complex of acetylacetone is a substantial reduction of the severity of the cure conditions. Thus, a product having a tensile lap shear of better than 4,000 psi. can be obtained using a metal complex of acetylacetone after a cure at 150° C.

for 15 minutes. This is in contrast with a tensile lap shear of about 2,400 to about 2,800 psi. using either a cure temperature of 200° C. for two hours with the specified prior art formulation and no accelerator or a cure temperature of 150° C. for 15 minutes using the same prior art formulation and a metal complex of acetylacetone.

The most preferred metal complex of acetylacetone for use herein as an accelerator is zinc acetylacetonate, however, other metal acetylacetonates are useful herein including iron acetylacetonate, aluminum acetylacetonate, magnesium acetylacetonate, nickel acetylacetonate, zirconium acetylacetonate, and the like. The metal complex of acetylacetone can be used in a range of 0.1 to about 5 parts per hundred parts of resin and preferably a range of about 0.5 to about 3 parts per hundred parts of resin.

The adhesive formulation cannot be mixed by heating the mixture without obtaining gelatin and hardening of the mixture. Instead admixing is carried out at about room temperature (about 20°–25° C.) to obtain a stable composition which can be applied to a substrate and cured at elevated temperatures. In this procedure the solid diaryl dianhydride and the solid maleic anhydride are suspended in a solution of the diglycidyl ether of bisphenol A and the polyglycidyl ether of a novolac resin. The suspension is formed by subjecting a mixture of the powdered anhydrides and the liquid epoxy resin mixture to a mixing under high shear for a time sufficient to maintain the solid anhydrides in suspension for a period of time greater than the expected storage time of the resin mixture. Preferred means for obtaining the suspension include the use of three-roll mills, ball mills, chain mills, and the like. Following this, the filler and the powdered metal can be incorporated into the suspension in the desired quantities by simple mechanical stirring.

The adhesive compositions of this invention are applied to a suitable substrate at room temperature or thereabout before curing. Since elevated temperatures are required for curing, the substrate should be such that it is not damaged by the high curing temperatures required. Normally, the adhesives of this invention are employed for the attachment of one metallic part to another, although ceramic or other heat resistant materials can also suitably be joined together with the adhesive compositions of this invention. It has been found that the prior treatment of the substrate is important so far as the strength of the tensile lap shear bond obtainable is concerned. Acid-etching is the preferred procedure for preparing a metal surface for bonding using the adhesive compositions of this invention.

The curing conditions that are useful herein include broadly, a temperature of about 100° C. to about 250° C., preferably about 130° C. to about 200° C. and most preferably about 140° C. to about 160° C. The time for cure is broadly about one second to about five hours and preferably about one minute to about 45 minutes. The lower the temperature, the longer the cure time required and the higher the temperature the shorter the cure time required. Low temperature, rapid cures are economically preferred.

When used herein, the expressions "parts per hundred parts of epoxy resin," "parts per hundred parts of resin" and "phr." are equivalent expressions and are used with specific reference to the total amount of epoxy resin in the formulation.

The following examples are set out to illustrate the novel process and compositions of the present invention and to provide a better understanding of its details and advantages.

As used herein, Epon 828 is a commercial liquid reaction product of bisphenol A and epichlorohydrin, which is sold by Shell Chemical Company. It possesses an epoxy equivalent value of 175–210 and a viscosity (cps.) at 25° C. of 10,000 to 20,000. D.E.N. 438 is a polyglycidyl ether of a phenol-formaldehyde novolac resin sold by Dow Chemical Company having an average of 3.6 epoxy groups per molecule and a viscosity (cps.) at 52° C. of 35,000 to 70,000.

Cab-O-Sil is a submicroscopic pyrogenic silica prepared in a hot gaseous environment (1,100° C.), having a external surface area of about 200 square meters per gram and a particle size of 0.015 micron, which was obtained from Cabot Corporation. Alclad is an aluminum alloy containing 3.8 to 4.9 percent copper which is sold by the Aluminum Company of America as Alclad 2024T3. The aluminum was acid-etched and the adhesive joints were tested by ASTM D1002-64 using four inch (10.2 cm.) by one inch (2.5 cm.) strips of the aluminum. Two strips were joined together lengthwise with a layer of the adhesive in a one-half square inch (1.3 sq. cm.) overlap joint.

EXAMPLE 1

This experiment exemplifies the prior art formulation. A suspension of powdered 3,4,3',4'-benzophenone tetracarboxylic dianhydride and Epon 828 was prepared on a three-roll mill in relative amounts to provide an A/E ratio of 0.6. Following this, three parts of Cab-O-Sil per hundred parts resin (phr.) and 100 phr. atomized aluminum were mixed in. The adhesive formulation was applied to two acid-etched Alclad strips, cured at 200° C. for two hours and tested in accordance with ASTM D1002-64. The tensile lap shear strength of a series of formulations made according to those proportions and conditions fell in the range of about 2,400 to about 2,800 psi.

EXAMPLE 2

Example 1 was repeated except that two parts of zinc acetylacetonate per hundred parts of resin were added to the formulation and the cure was effected at 150° C. for 15 minutes. The tensile lap shear strength of the freshly tested joint was found to be 2,800 psi.

EXAMPLE 3

All proportions and conditions of Example 2 were repeated in a series of three formulations except that the epoxy resin portion was a mixture of D.E.N. 438 and Epon 828 in weight ratios of 2:1, 1:1 and 1:2. No maleic anhydride was present. The tensile lap shear value for Alclad joints made as described in Example 1 was 2,550 psi. for each formulation.

EXAMPLE 4

Two formulations were prepared as described in Example 2 except that both included maleic anhydride in a weight ratio of maleic anhydride to 3,4,3',4'-benzophenone tetracarboxylic dianhydride of 1:1. No polyglycidyl ether of a novolac resin was present. The first formulation was prepared with an A/E ratio of 0.85 and the resulting Alclad joint cured at 150° C. for 15 minutes was found to have a tensile lap shear strength of 3,000 psi. The second formulation was prepared with an A/E ratio of 1.15 and after curing the resulting Alclad joint at 150° C. for 30 minutes, its tensile lap shear strength was determined to be 3,220 psi.

EXAMPLE 5

A solution of D.E.N. 438 in Epon 828 was prepared in a weight ratio of 2:1. A 1:1 weight ratio of maleic anhydride and 3,4,3',4'-benzophenone tetracarboxylic dianhydride was suspended in the solution of epoxides at an A/E ratio of 1.15. Three parts per hundred parts resin (phr.) of Cab-O-Sil, 100 phr. of atomized aluminum and two phr. zinc acetylacetonate were incorporated into the formulation. Four Alclad joints were prepared and each was cured at 150° C. for 15 minutes. Tensile lap shear strengths for the four joints were measured as 4,300; 4,315; 4,285 and 3,620 psi., respectively, for an average tensile lap shear strength of 4,130 psi.

EXAMPLE 6

A second formulation was prepared using the same conditions and proportions as described in Example 5. Three Alclad joints were prepared from this formulation and were cured at 150° C. for 15 minutes. The tensile lap shear strength for each of these three joints was measured and found to be 4,060; 3,760 and 3,635 psi., respectively, for an average of 3,820 psi.

EXAMPLE 7

The procedure of Example 5 was repeated using the same proportions and conditions. After curing an Alclad joint prepared from this formulation, the sample exhibited a tensile lap shear strength of 3,980 psi.

EXAMPLE 8

Example 5 was repeated using the same proportions and conditions except that the epoxy resin mixture was D.E.N. 438 and Epon 828 in a weight ratio of 1:2. Two joints were prepared and cured at 150° C. for 30 minutes and found to have a tensile lap shear strength by ASTM D1002-64 of 3,780 and 3,210 psi., respectively, for an average of 3,495 psi.

EXAMPLE 9

Four resin samples were made according to the procedure of Example 5 except that different accelerators were used. All samples were cured at 150° C. for 30 minutes. The first sample contained no accelerator and was found to have a tensile lap shear strength of 802 psi. The second sample utilized two phr. of dicyandiamide and resulted in a tensile lap shear strength of 2,670 psi. The third sample utilizing two phr. of 2-ethyl-4-methylimidazole resulted in a tensile lap shear strength of 2,620 psi. The fourth sample utilizing two phr. parts resin of benzyldimethylamine resulted in a tensile lap shear strength of 2,670 psi.

It is to be understood that the above disclosure is by way of specific example and that numerous modifications and variations are available to those of ordinary skill in the art without departing from the true spirit and scope of the invention.

I claim:

1. A new adhesive composition suitable for application at room temperature and which on curing results in an adhesive joint having excellent tensile lap shear strength comprising a mixture of
   3,4,3',4'-benzophenone tetracarboxylic dianhydride and maleic anhydride in a weight ratio of from about 4:1 to about 1:3;
   a polyglycidyl ether of a phenol-formaldehyde novolac resin having an average of two to about four epoxy groups per molecule and a diglycidyl ether of a dihydric phenol having a molecular weight between about 350 and 600 in an amount to provide an A/E ratio of between about 0.4 and about 1.5 at a weight ratio of the polyglydicyl ether of the novolac resin to the diglycidyl ether of a dihydric phenol of between about 4:1 to about 1:3; and
   about 0.1 part to about 5 parts of a metal complex of acetylacetone selected from the group consisting of zinc acetylacetonate, iron acetylacetonate, aluminum acetylacetonate, magnesium acetylacetonate, nickel acetylacetonate and zirconium acetylacetonate per 100 parts of epoxy resin.

2. A new adhesive composition in accordance with claim 1 in which the weight ratio of 3,4,3',4'-benzophenone tetracarboxyl dianhydride to maleic anhydride is between about 3:1 and about 1:2 and the weight ratio of the polyglycidyl ether of the novolac resin to the diglycidyl ether of a dihydric phenol is between about 3:1 and about 1:1.

3. A new adhesive composition in accordance with claim 1 in which the metal complex of acetylacetone is zinc acetylacetonate.

4. A new adhesive composition in accordance with claim 3 in which the weight ratio of anhydrides is about 1:1, the diglycidyl ether of a dihydric phenol is a diglycidyl ether of bisphenol A in about a 1:2 weight ratio with the polyglycidyl ether of a novolac resin, and the A/E ratio is between about 0.6 and about 1.25.

5. A new adhesive composition in accordance with claim 1 which includes about 20 parts to about 100 parts of a powdered metal per 100 parts of the resin, and about one part to about 50 parts of a non-metallic oxide filler per 100 parts of resin.

6. A new cured adhesive composition comprising
   3,4,3',4'-benzophenone tetracarboxylic dianhydride and maleic anhydride in a weight ratio of from about 4:1 to about 1:3; and
   a polyglycidyl ether of a phenol-formaldehyde novolac resin having an average of two to about four epoxy groups per molecule and a diglycidyl ether of a dihydric phenol having a molecular weight between about 350 and 600 in an amount to provide an A/E ratio of between about 0.4 and about 1.5 at a weight ratio of the polyglycidyl ether of the novolac resin to the diglycidyl ether of a dihydric phenol of between about 4:1 to about 1:3;
   said composition prepared at a temperature between about 100° C. and about 250° C. in the presence of about 0.1 part to about 5 parts of a metal complex of acetylacetone selected from the group consisting of zinc acetylacetonate, iron acetylacetonate, aluminum acetylacetonate, magnesium acetylacetonate, nickel acetylacetonate and zirconium acetylacetonate per 100 parts of epoxy resin.

7. A new adhesive composition in accordance with claim 6 in which the weight ratio of 3,4,3',4'-benzophenone tetracarboxylic dianhydride to maleic anhydride is between about 3:1 and about 1:2 and the weight ratio of the polyglydicyl ether of the novolac resin to the diglycidyl ether of a dihydric phenol is between about 3:1 and about 1:1.

8. A new adhesive composition in accordance with claim 6 in which the weight ratio of the anhydrides is about 1:1, the diglycidyl ether of a dihydric phenol is a diglycidyl ether of bisphenol A at a weight ratio to the polyglycidyl ether of the novolac resin of about 1:2 and the A/E ratio is between about 0.6 and about 1.25.

9. A new adhesive composition in accordance with claim 8 which includes about 20 parts to about 100 parts of a powdered metal per 100 parts of the resin, and about one part to about 50 parts of a non-metallic oxide filler per 100 parts of resin.

* * * * *